(12) United States Patent
Staal et al.

(10) Patent No.: US 12,491,691 B2
(45) Date of Patent: Dec. 9, 2025

(54) APPARATUS, SYSTEM, AND METHOD FOR REINFORCING COMPOSITE STRUCTURE

(71) Applicant: The Boeing Company, Chicago, IL (US)

(72) Inventors: Remmelt Andrew Staal, Irvine, CA (US); Glory C. Edwards, Edmonds, WA (US); Gregory J. Smith, Philipsburg, MT (US); Justin H. Register, Charleston, SC (US); Ernie Fidgeon, Ymir (CA)

(73) Assignee: The Boeing Company, Arlington, VA (US)

( * ) Notice: Subject to any disclaimer, the term of this patent is extended or adjusted under 35 U.S.C. 154(b) by 411 days.

(21) Appl. No.: 17/718,027

(22) Filed: Apr. 11, 2022

(65) Prior Publication Data

US 2022/0388259 A1 Dec. 8, 2022

Related U.S. Application Data

(60) Provisional application No. 63/196,112, filed on Jun. 2, 2021.

(51) Int. Cl.
| | |
|---|---|
| *B29C 73/10* | (2006.01) |
| *B29L 31/30* | (2006.01) |
| *B32B 3/12* | (2006.01) |
| *B32B 5/02* | (2006.01) |
| *B32B 5/26* | (2006.01) |
| *B32B 7/12* | (2006.01) |
| *B32B 15/14* | (2006.01) |

(52) U.S. Cl.
CPC ............... *B29C 73/10* (2013.01); *B32B 3/12* (2013.01); *B32B 5/024* (2013.01); *B32B 5/263* (2021.05); *B32B 7/12* (2013.01); *B32B 15/14* (2013.01); *B29L 2031/3076* (2013.01)

(58) Field of Classification Search
CPC .......... B29C 73/10; B32B 5/263; B32B 3/12; B32B 5/024; B32B 7/12; B32B 15/14; B29L 2031/3076
See application file for complete search history.

(56) References Cited

U.S. PATENT DOCUMENTS

| | | | |
|---|---|---|---|
| 4,054,477 A * | 10/1977 | Curran | B32B 3/12 156/212 |
| 2014/0238579 A1* | 8/2014 | Dan-Jumbo | B64F 5/40 156/94 |
| 2017/0008268 A1* | 1/2017 | Ackerman | B29C 65/562 |

* cited by examiner

*Primary Examiner* — Alicia J Weydemeyer
*Assistant Examiner* — Laura B Figg
(74) *Attorney, Agent, or Firm* — Kunzler Bean & Adamson

(57) ABSTRACT

Disclosed herein are a repair apparatus, system, and method for structurally reinforcing an abnormal composite structural member. The repair is suited for reinforcing a cured composite structure that defines a strength tolerance and has an abnormality that reduces the structural strength relative to the strength tolerance of the cured composite. The structural reinforcement repairs the abnormality in the cured composite and provides the repair strength so that the repaired composite has a structural strength that meets or exceeds the strength tolerance. The structural reinforcement has a composite patch that is coupled to the cured composite over the abnormality and is covered by pressure-sensitive tape.

20 Claims, 14 Drawing Sheets

APPARATUS, SYSTEM, AND METHOD FOR REINFORCING COMPOSITE STRUCTURE

CROSS-REFERENCE TO RELATED APPLICATION

This application claims the benefit of U.S. Provisional Patent Application No. 63/196,112, filed Jun. 2, 2021, which is hereby incorporated by reference herein in its entirety.

FIELD

This disclosure relates generally to a method of repairing composite structures. More particularly, this disclosure relates to repairs for an abnormal section of a composite solid laminate or sandwich panel structure.

BACKGROUND

Composite structures, or structures made at least partially from a fiber-reinforced polymer, provide several structural benefits, such as strength and stiffness, in a lightweight package. Accordingly, composite structures are beneficial for use in structural assemblies designed to have variable strength, thickness, and other structural properties.

Often used composite structures include sandwich panels and solid laminates, which are formed from multiple plies stacked together or overlaid on top of each other. The stack of plies, when bonded together, is commonly referred to as a laminate or a laminated layer. Sandwich panels provide a lightweight mechanism to carry bending loads. Sandwich panels generally have a core interposed between a first sheet and a second sheet. In some examples, the first sheet and the second sheet are two solid laminates or laminate layers and are commonly referred to as a facesheet and a backsheet. The core, which separates the first sheet from the second sheet, increases the bending strength to weight ratios of the composite structure. In contrast, while solid laminates include multiple stacked plies, they do not have a core that separates sheets of stacked plies.

Whether in a sandwich panel or a solid laminate, each ply of the stack of plies includes a plurality of fibers embedded in a matrix material. The fibers of the ply can be unidirectional and define a ply orientation or woven and have an orthogonal orientations. The matrix material of each ply bonds (e.g., via curing) with the matrix material of at least one adjacent ply of the stack of plies to form the laminate or laminated layer of the composite structure.

The orientation of the plies (e.g., the fibers within the plies) determines the strength properties of the composite structure in that direction. In other words, the relative orientation of the fibers of the multiple plies establishes the design strength and strength properties for the sandwich panel or solid laminate. For example, the bending strength of the composite structure is customized for the expected bending load. Additional plies orient additional fibers in particular directions to increase the strength of the composite structure for supporting an expected load. For example, a tensile or compressive strength is increased in a particular direction by increasing the fibers oriented in that direction. In view of the foregoing, at least some of the multiple plies of composite structure are typically oriented at angles relative to each other. In other words, the fibers of at least one ply is oriented at some angle relative to the fibers of at least another one of the plies. In some examples, the plies of a composite structure are oriented symmetrically. For example, a laminate or laminated layer of the composite structure can have the same number and same orientation of plies on either side of a mid-plane of the laminate or laminated layer, such that the plies "stack up" symmetrically about the mid-plane.

Both solid laminates and sandwich panels are subject to abnormalities such as buckling and/or disbonded layers. Conventional repairs of abnormalities in solid laminates and sandwich panels are time consuming and require specialized equipment. Rapidly and efficiently restoring the design strength of composite structures that have such abnormalities can be difficult, especially in challenging repair environments.

SUMMARY

The subject matter of the present application provides examples of an apparatus, system, and method that overcome at least some of the above-discussed shortcomings of prior art techniques for composite repair. The subject matter of the present application has been developed in response to the present state of the art, and in particular, in response to shortcomings of conventional composite repair processes.

Disclosed herein is a structural repair, and corresponding repair process, for a composite structure, such as a cured composite of a structural member of the composite structure. The following is a non-exhaustive list of examples, which may or may not be claimed, of the subject matter, disclosed herein.

In one example, a composite structure comprises a structural member made of a cured composite that defines a strength tolerance and has an abnormality. The abnormality has a reduced strength relative to the strength tolerance of the cured composite. A structural reinforcement has a repair strength that is coupled to the cured composite over the abnormality. The structural reinforcement has a patch that comprises a plurality of plies. Each ply in the plurality of plies comprises a fiber reinforcement embedded in a matrix material. The plurality of plies defines a first side of the plurality of plies and a second side of the plurality of plies opposite the first side. The structural reinforcement further comprises a patch adhesive comprising an adhesive material that is coupled on the first side of the plurality of plies and a pressure-sensitive tape comprising a metallic material and a tape adhesive, fixed to the metallic material, wherein the pressure-sensitive tape is fixed to and covers an entirety of the second side of the patch. The preceding subject matter of this paragraph characterizes example 1 of the present disclosure.

The structural reinforcement provides a repair strength that is equal to or exceeds the strength tolerance of the cured composite. The preceding subject matter of this paragraph characterizes example 2 of the present disclosure, wherein example 2 also includes the subject matter according to example 1 above.

The patch further comprises an overlay portion that extends beyond the outer peripheral edge of the abnormality and about an entirety of the abnormality. The preceding subject matter of this paragraph characterizes example 3 of the present disclosure, wherein example 3 also includes the subject matter according to any one of examples 1-2 above.

The patch covers a predetermined area, and the predetermined area is greater than the abnormality of the cured composite. The preceding subject matter of this paragraph characterizes example 4 of the present disclosure, wherein example 4 also includes the subject matter according to any one of examples 1-3 above.

The cured composite is a solid laminate, and the first side of the patch is adhesively bonded directly to the solid laminate. The preceding subject matter of this paragraph characterizes example 5 of the present disclosure, wherein example 5 also includes the subject matter according to any one of examples 1-4 above.

The cured composite is a sandwich panel that comprises a core interposed between a first sheet and a second sheet. The patch is adhesively bonded directly to the first sheet. The preceding subject matter of this paragraph characterizes example 6 of the present disclosure, wherein example 6 also includes the subject matter according to any one of examples 1-5 above.

The core comprises a honeycomb panel with elongated channels oriented orthogonally relative to the first sheet and the second sheet. The honeycomb panel carries a shear load between the first sheet and the second sheet. The preceding subject matter of this paragraph characterizes example 7 of the present disclosure, wherein example 7 also includes the subject matter according to example 6 above.

The repair strength is equal to a summation of a patch strength of the patch, and a tape strength of the pressure-sensitive tape and the patch strength is greater than the tape strength. The preceding subject matter of this paragraph characterizes example 8 of the present disclosure, wherein example 8 also includes the subject matter according to any one of examples 1-7 above.

The repair strength is greater than the strength tolerance. The preceding subject matter of this paragraph characterizes example 9 of the present disclosure, wherein example 9 also includes the subject matter according to example 8 above.

The patch strength is less than the repair strength. The preceding subject matter of this paragraph characterizes example 10 of the present disclosure, wherein example 10 also includes the subject matter according to example 8 above.

The plurality of plies comprises a first ply and a second ply. The fiber reinforcement of the first ply is oriented in a first direction, and the fiber reinforcement of the second ply is oriented in a second direction that is different than the first direction. The preceding subject matter of this paragraph characterizes example 11 of the present disclosure, wherein example 11 also includes the subject matter according to any one of examples 1-10 above.

The first direction is orthogonal to the second direction. The preceding subject matter of this paragraph characterizes example 12 of the present disclosure, wherein example 12 also includes the subject matter according to example 11 above.

The first direction is 45° relative to the second direction. The preceding subject matter of this paragraph characterizes example 13 of the present disclosure, wherein example 13 also includes the subject matter according to example 11 above.

Additionally, disclosed herein is a method of repairing a composite structure using the structural reinforcement. The method comprises applying a patch comprising fibers embedded in a matrix material and a patch adhesive coupled to the matrix material. The patch is applied onto a cured composite over an abnormality of the cured composite. The method further comprises applying a pressure-sensitive tape over the patch and the cured composite such that the metallic adhesive tape adheres to the patch and a second portion of the cured composite surrounds the first portion of the cured composite. The preceding subject matter of this paragraph characterizes example 14 of the present disclosure.

The method further comprises removing a coating layer of the cured composite surrounding the abnormality of the cured composite. Before applying the patch and after removing the coating layer and heating the cured composite, the method also comprises abrading the first portion and the second portion of the cured composite to form an abraded portion of the cured composite. Before applying the patch and after removing the coating layer, the method further comprises heating the cured composite, and abrading the first portion and/or the second portion of the cured composite, cleaning the abraded portion of the cured composite with a solvent to form a clean abraded portion of the cured composite. The step of applying the patch comprises applying the patch onto the clean abraded portion of the cured composite. The preceding subject matter of this paragraph characterizes example 15 of the present disclosure, wherein example 15 also includes the subject matter according to example 14 above.

The patch further comprises a protective layer that covers and is releasably coupled to the patch adhesive. The method further comprises removing the patch adhesive protective layer before applying the patch onto the cured composite. The preceding subject matter of this paragraph characterizes example 16 of the present disclosure, wherein example 16 also includes the subject matter according to any one of examples 14-15 above.

After the step of applying the patch onto the cured composite, the method further comprises applying a vacuum bag over the patch, wherein applying pressure to the patch comprises reducing the pressure within the vacuum bag. The preceding subject matter of this paragraph characterizes example 17 of the present disclosure, wherein example 17 also includes the subject matter according to any one of examples 14-16 above.

The patch has a patch curvature that is different from a composite curvature of the cured composite, and the step of applying the patch onto the cured composite further comprises adjusting the patch curvature to complement the composite curvature. The preceding subject matter of this paragraph characterizes example 18 of the present disclosure, wherein example 18 also includes the subject matter according to any one of examples 14-17 above.

Further disclosed herein is a structural reinforcement for repairing a abnormal surface of a composite structure. The structural reinforcement comprises a patch having a patch strength. The patch further comprises a plurality of plies in a stacked arrangement. Each one of the plurality of plies is made of a fiber-reinforced polymeric material comprising a matrix material and fibers embedded in the matrix material. The plurality of plies define a first side and a second side of the plurality of plies opposite the first side. The structural reinforcement further comprises a patch adhesive fixed on the first side of the plurality of plies and comprising an adhesive material and a pressure-sensitive tape, having a tape strength and comprising a metallic material and a tape adhesive fixed to the metallic material. The pressure-sensitive tape is fixed to and covers an entirety of the second side of the patch, and the patch strength is greater than the tape strength. The preceding subject matter of this paragraph characterizes example 19 of the present disclosure.

The structural reinforcement further comprises a second patch coupled to the patch and captured between the second side of the patch and the tape adhesive of the pressure-sensitive tape that covers the entirety of the second patch and the second side of the patch. The preceding subject matter of this paragraph characterizes example 20 of the present disclosure, wherein example 20 also includes the subject matter according to example 19 above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not, therefore, to be considered to be limiting of its scope, the subject matter will be described and explained with additional specificity and detail through the use of the drawings, in which.

DETAILED DESCRIPTION

Figure 1:
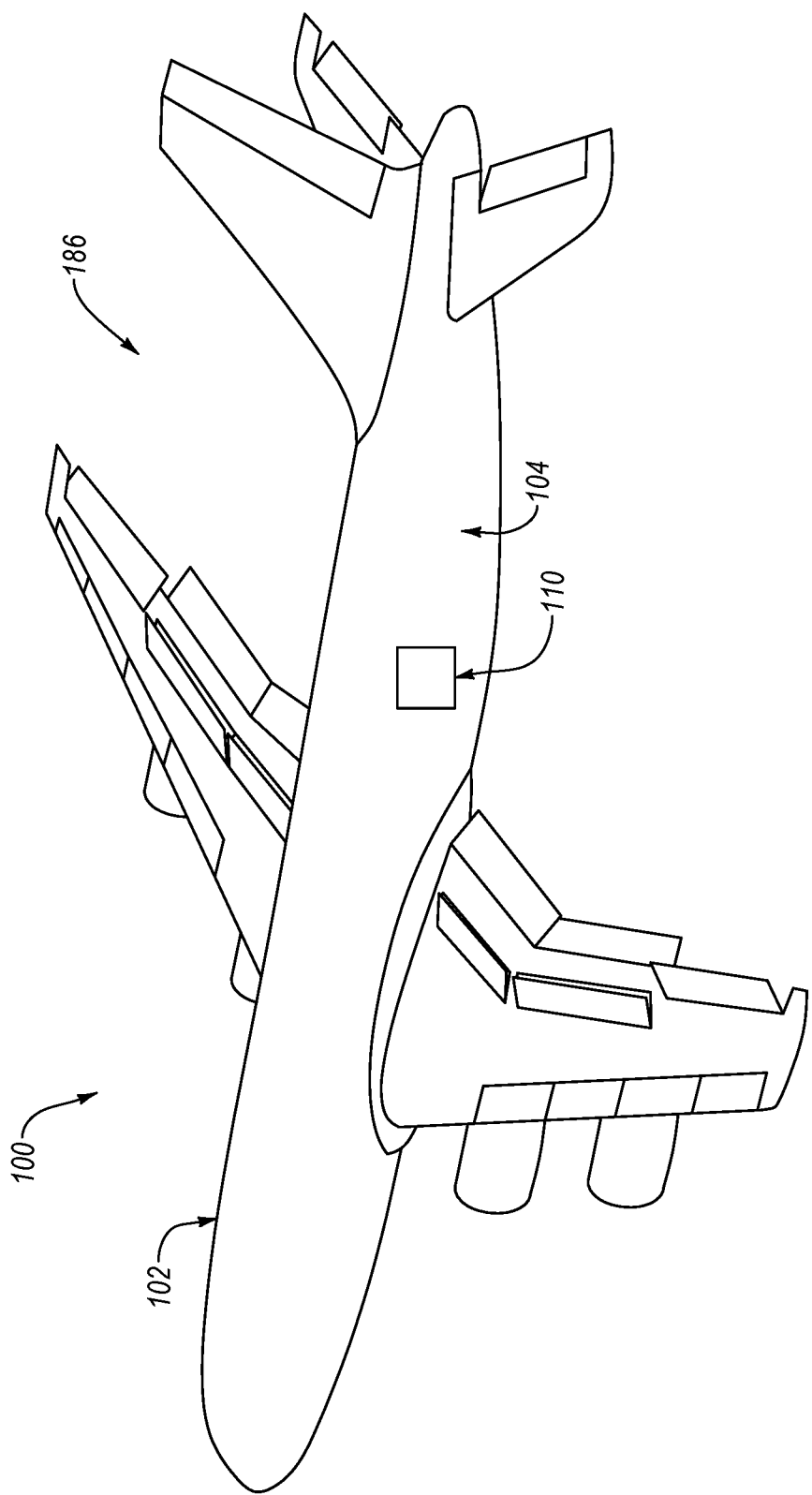
FIG. 1 is a schematic perspective view of an aircraft with a structural reinforcement, according to one or more examples of the present disclosure.

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure; however, absent an express correlation to indicate otherwise, an implementation may be associated with one or more examples.

Composite materials, or fiber-reinforced polymers, are used in applications where lightweight and stiff materials are desirable. In some examples, composite materials are incorporated into composite structures, such as solid laminate panels and sandwich panels. Solid laminate panels include multiple plies (sometimes referred to as layers) made of composite materials and arranged in a stacked configuration. In contrast, sandwich panels include a first sheet (i.e., a facesheet or first layer), a second sheet (i.e., backsheet or second layer) opposite the first sheet, and a core interposed between the first sheet and the second sheet. The core increases the bending strength of the first sheet and the second sheet.

An abnormality, such as damaged or worn plies made of composite materials, reduces the design strength and/or structural properties of the composite structure. For example, in the case of sandwich panels, a bond between the core and the first sheet (or second sheet) can become delaminated or the core, first sheet, and/or second sheet can buckle. Similarly, a compressive load can dent or damage one or more plies on a solid laminate. Conventional methods for repairing composite materials in the field utilize specialized equipment to remove the damaged area and repair the composite structure of a solid laminate or a sandwich panel.

Disclosed herein is a process for a structural repair of a composite structure that restores or increases the structural strength and/or capabilities of the composite structure. Generally, the structural repair includes applying one or more patches onto the composite structure over the abnormality. In some examples, the patches are sized to cover the abnormality and portions of the composite structure surrounding the abnormality, which helps to increase the strength of the structural repair. In this way, the patches enable an efficient and a customizable structural repair. For example, a group of predetermined patch sizes and/or contours can be used together to restore the structural strength of the panel quickly and efficiently, even in challenging repair environments.

Unless otherwise noted, as used herein, to bond, bonding, "is bonded," and other variants of "bond" means that one structure is coupled to and/or joined to an adjacent structure. The bonding process may use adhesives, mechanical hook-and-loop fasteners, chemical bonds, etc. to join the structures together in a bond. Bonding includes, but is not limited to, adhesive bonding, solvent bonding, and/or thermal bonding between two structures. For example, thermal bonding may result in a thermoset or thermoplastic bond. As used herein, adhering (i.e., adhesively bonding) is a bonding process with an adhesive. In some examples, the adhesive bonds the structural reinforcement and/or patch without a curing/thermal process, but by other means, such as via pressure.

Referring to FIG. 1, according to one example, a composite structure 100 includes a structural member 102 made of a cured composite 104. In the illustrated example, the composite structure 100 is an aircraft 186 and the structural member 102 is any of various parts of the aircraft, such as the fuselage, wing, or stabilizers. The composite structure 100 also includes a structural reinforcement 110 that is coupled to the cured composite 104. Although not shown in FIG. 1, the structural reinforcement 110 is coupled to the cured composite 104 over an abnormality in (e.g., damage to) the cured composite 104. In effect, the structural reinforcement 110 repairs the abnormality 106, such as an inconsistency in the cured composite 104. The cured composite 104 is designed to provide strength. When the cured composite 104 has an abnormality 106, the strength is reduced at the abnormality 106. The structural reinforcement helps to increase the strength of the cured composite 104 at the abnormality 106.

In some examples, the abnormality 106 reduces the strength of the cured composite 104 relative to the strength tolerance of the cured composite 104. For example, the cured composite 104 is designed to carry one or more non-limiting loads, such as a tensile load, a compressive load, a shear load, a bearing load, and/or a bending load. In some examples, the expected loads are compared to the designed strength of the cured composite 104 to establish a design tolerance. For example, the cured composite 104 can have a designed bending strength that is optimized to carry an expected bending load. The bending tolerance compares the bending strength of the design to the expected load to calculate whether the cured composite 104 is adequate for the expected load. The cured composite 104 has a positive bending tolerance indicating that the bending strength is greater than the expected load by some factor. Similar tolerances are established for all the expected loads on the cured composite 104. For example, the cured composite 104 can have one or more bending, bearing, compression, tensile, or shear strengths, each with an associated tolerance.

The structural reinforcement 110 is coupled to the cured composite 104 over the abnormality 106 to repair the strength and/or restore the strength tolerance of the cured composite 104. In other words, the structural reinforcement 110 provides a repair strength that restores the strength of the cured composite 104. In various examples, the repair strength may equal or exceed the design strength tolerance of the cured composite 104. For example, the repair strength exceeds the strength tolerance in one or more of bearing, bending, buckling, shear, tension, compression, etc.

Figure 8:
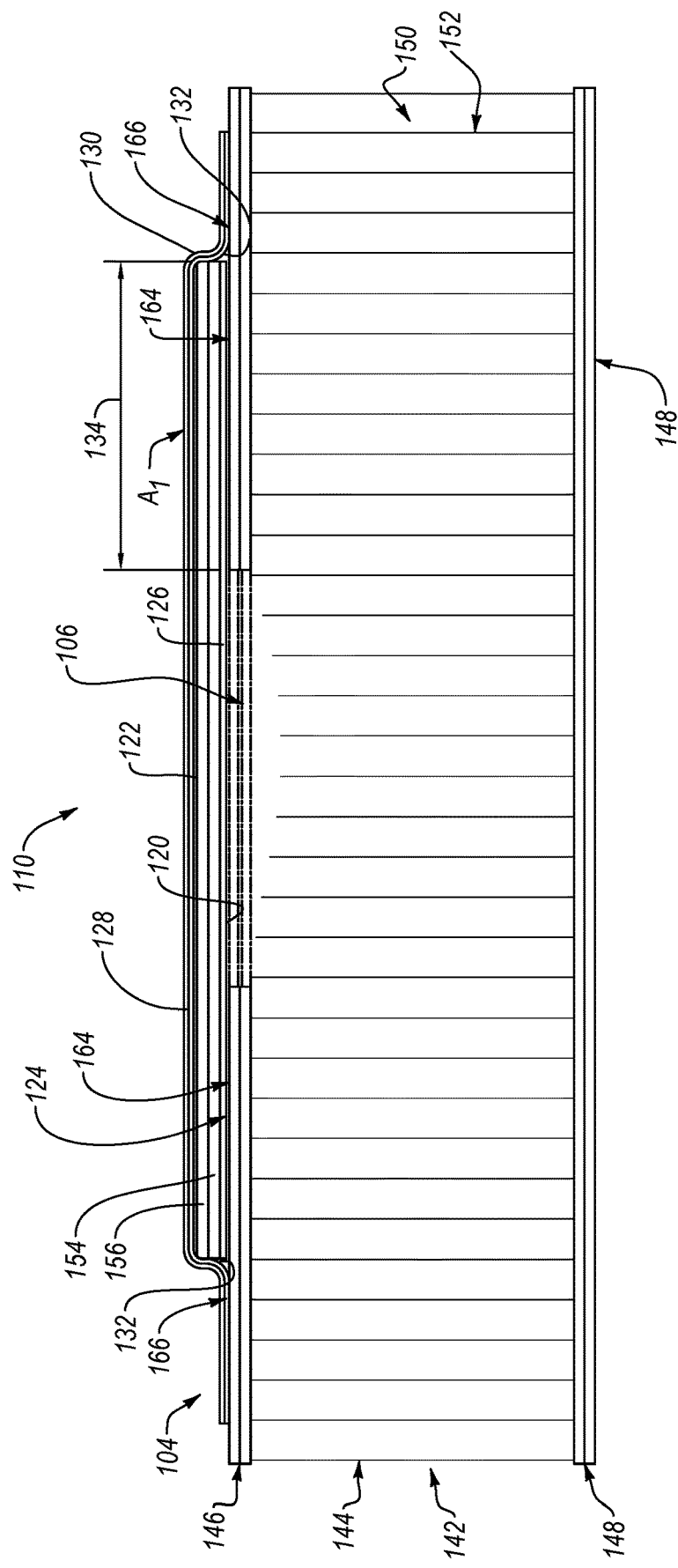
FIG. 8 is a schematic, sectional, side elevation view of a structural reinforcement attached to a sandwich panel, according to one or more examples of the present disclosure.

The structural reinforcement 110 has similar characteristics as the cured composite 104, which facilitate bonding together of the structural reinforcement 110 and the cured composite 104. For example, the cured composite 104 and the structural reinforcement 110 have similar coefficients of thermal expansion and/or electrical conductivities. In some examples, the structural reinforcement 110 is at least partially made from the same material as the cured composite 104. For example, referring to FIG. 2, the structural reinforcement 110 includes a patch 112 with multiple plies 114. Each one of the multiple plies 114 is made from a fiber-reinforced polymer that is similar to the fiber-reinforced polymer of the cured composite 104. Referring to FIG. 8, and as will be discussed in more detail, the structural reinforcement 110 also includes a pressure-sensitive tape 128, such as a metallic adhesive tape or other tape, that helps hold the patch 112 during a curing process and provides an electrically conductive path for the composite structure 100.

Figures 2, 3:
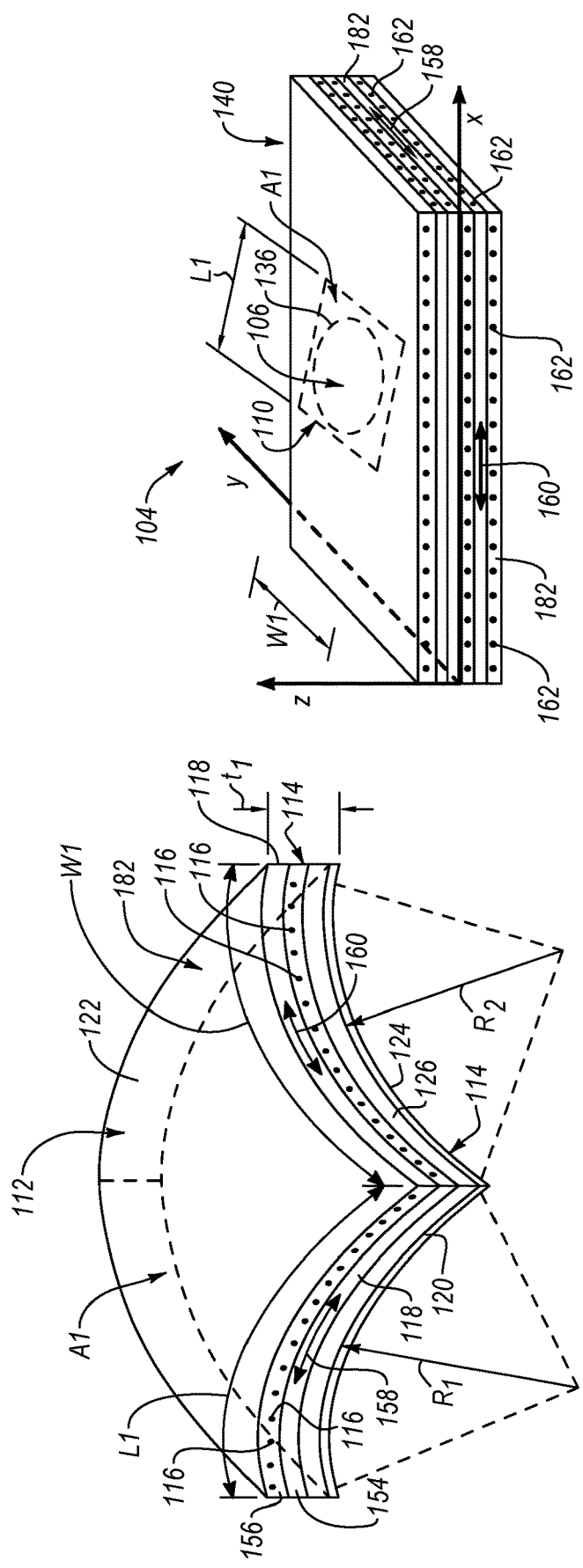
FIG. 2 is a schematic perspective view of a composite patch, according to one or more examples of the present disclosure.
FIG. 3 is a schematic perspective view of a solid laminate, according to one or more examples of the present disclosure.

Referring to FIG. 2, the structural reinforcement 110 includes a patch 112. The patch 112 has one or more plies 114 and a patch adhesive 124 coupled to the one or more plies 114. In the illustrated example of FIG. 2, the patch 112 includes multiple plies 114, such as a first ply 154 and a second ply 156. Whether the patch 112 has one ply 114 or more than one ply 114, each ply 114 of the patch 112 (e.g., each one of the first ply 154 and the second ply 156) includes a matrix material 118 and a fiber reinforcement 116 is embedded in the matrix material 118. The plurality of plies 114 defines a first side 120 of the patch 112 and a second side 122 that is opposite the first side 120. In some examples, a midplane of the patch 112 is defined halfway between the first side 120 and the second side 122 of the patch 112.

The fiber reinforcement 116 of each ply 114 includes a plurality of fibers made of any of various materials, such as carbon, fiberglass, and the like. In some examples, the fibers of the fiber reinforcement 116 of a given ply 114 are unidirectional and oriented to extend in a particular direction relative to the patch 112. In other examples, the fibers of the fiber reinforcement 116 of a given ply 114 are woven together such that some fibers of the given ply 114 are orthogonal relative to other fibers. In one example, the fiber reinforcements 116 of the first ply 154 are oriented in a first direction 158 and the fiber reinforcements 116 of the second ply 156 are oriented in a second direction 160 that is different than the first direction 158. For example, in FIG. 2, the first direction 158 is orthogonal to the second direction 160. In another example, the first direction 158 is 45° relative to the second direction 160, or some other angle, such as 15°, 30°, 60°, and the like, relative to the second direction 160. In some examples, the orientations of the fiber reinforcements 116 in the plurality of plies 114 is symmetric about the midplane.

The patch 112 has a thickness t1, a length L1, and a width W1. In some examples, like shown in FIG. 2, the patch 112 has a patch curvature, defined by radius R1 and/or radius R2. Radius R1 defines a curvature along the length L1 or first direction 158 of the patch 112. Radius R2 defines a curvature along the width W1 or second direction 160. In some examples, the curvature defined by radius R1 and/or R2 is different from the curvature of the cured composite 104. In other words, in some examples, the curvature of the patch 112 can be changed, if needed, to apply the patch 112 over the abnormality 106 on the cured composite 104. In some examples, the patch 112 is heated and/or adjusted to change the patch curvature (e.g., radius R1 and/or radius R2) to complement the composite curvature of the structural member 102.

The dimensions of the width W1 and the length L1 define an area A1 of the patch 112. In one example, the patch 112 has a curvature defined by radius R1 and/or radius R2 and an area A1 defined by the width W1 and the length L1. In such an example, the patch 112 has an area A1 that is predetermined and curved. In some examples, the radius R1 and the radius R2 are zero, such that the patch 112 is planar or flat and the patch 112 defines an area A1 that is predetermined and flat.

Still referring to FIG. 2, the patch adhesive 124 is coupled to the first side 120 of the patch 112. The patch adhesive 124 is made of an adhesive material 126 that helps bond the patch 112 to the cured composite 104. Accordingly, the patch adhesive 124 helps bond the patch 112 to the cured composite 104. For example, as shown in FIG. 8, the patch adhesive 124 and the pressure-sensitive tape 128 can bond the structural reinforcement 110 to the aircraft 186.

In some examples, the patch 112 can be part of a standard repair kit for structural repairs. The standard repair kit can include one or more patches 112 each having the same or a different predetermined area A1. In other words, a repair crew does not need to prepare unique patches for an abnormality 106, but instead can use any one or a combination of patches 112 with the same or different predetermined areas A1 to repair abnormalities having any of various sizes of abnormality 106. The patches 112 are precured, e.g., in a factory before being shipped to the field. This facilitates and/or eliminates a curing stage of the patch 112 in the field.

Referring to FIG. 3, the solid laminate 140 (sometimes referred to as a laminate layer) has multiple plies 114 that are stacked together. In one example, the solid laminate 140 has an abnormality 106 that reduces the strength of the cured composite 104 and/or load capacity of the cured composite 104. A structural repair using the structural reinforcement 110 helps restore the load capacity and/or strength of the cured composite 104. In this way, a service technician or repairperson can stock a set of patches 112 of various sizes and/or curvatures for typical repairs on a particular cured composite 104, e.g., for the model of the aircraft 186. Once the abnormality 106 is known, and the size and curvature (if any) of the cured composite 104 are determined, the technician finds the corresponding patch 112 (or patches) that is suited for the structural reinforcement 110.

In various examples, the structural reinforcement 110 is oriented in a particular direction on the cured composite 104. In one example, the cured composite 104 has a first ply 154 oriented in a first direction 158 and a second ply 156 oriented in a second direction 160. The plies 114 of the patch 112 are oriented to have the same orientation as the abnormal plies in the cured composite 104. The cured composite 104 is designed with a variable strength in different directions. The orientation of the plies 114 in the cured composite 104 establishes the design orientation and the patch 112 is oriented in the same direction as one or more of the first ply 154 and/or the second ply 156 in the cured composite 104. For example, the patch 112 is oriented so that the fiber reinforcements 116 of the patch 112 overlap and are parallel to the fibers 162 of the cured composite 104.

In general, the area A1 of the patch 112 is greater than an area of the abnormality 106 on the cured composite 104. In one example, a single patch 112 covers a predetermined area A1 that is less than the abnormality 106. In this example, multiple patches 112 are utilized to cover the abnormality 106. For example, the predetermined areas A1 for two or more patches 112 are overlapped or overlaid to add and/or cover an abnormality 106 that exceeds the predetermined area A1 of only one patch 112.

Figure 4:
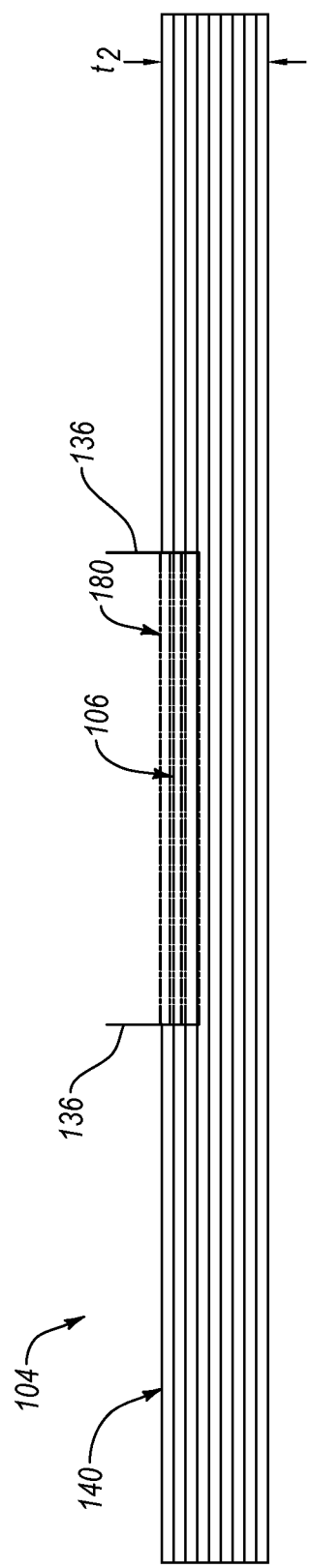
FIG. 4 is a schematic, sectional, side elevation view of a solid laminate having an abnormality, according to one or more examples of the present disclosure.

Referring to FIG. 4, the abnormality 106 creates an abnormal surface 180, shown with dashed lines, on at least one outer ply of the solid laminate 140. The abnormality 106 in the solid laminate 140 is removed (e.g., abraded) and the remaining portion of the solid laminate 140 surrounding the void left by the removal of the abnormality is cleaned and/or heated. For example, the solid laminate 140 is heated to a temperature for a fixed duration to remove moisture that would otherwise become trapped between the structural reinforcement 110 and the cured composite 104 when bonded to the cured composite 104, as will be described below. In one example, plies of the cured composite 104, which are adjacent to the void left behind by the removal of the abnormality 106, are abraded and cleaned to enhance the bond of the structural reinforcement 110 to the cured composite 104.

In some examples, the abnormality 106 has an outer peripheral edge 136 that defines the size (e.g., area) of the abnormality 106. For example, a crack in the solid laminate 140 would define the outer peripheral edge 136 of the abnormality 106. However, the outer peripheral edge 136 and the size of the abnormality is effectively enlarged during the abrading or removal process. The patch 112 is then adhesively bonded directly to the solid laminate 140. Specifically, the patch 112 covers at least the outer peripheral edge 136, after enlargement, and is bonded directly to the plies of the solid laminate 140.

Figure 5:
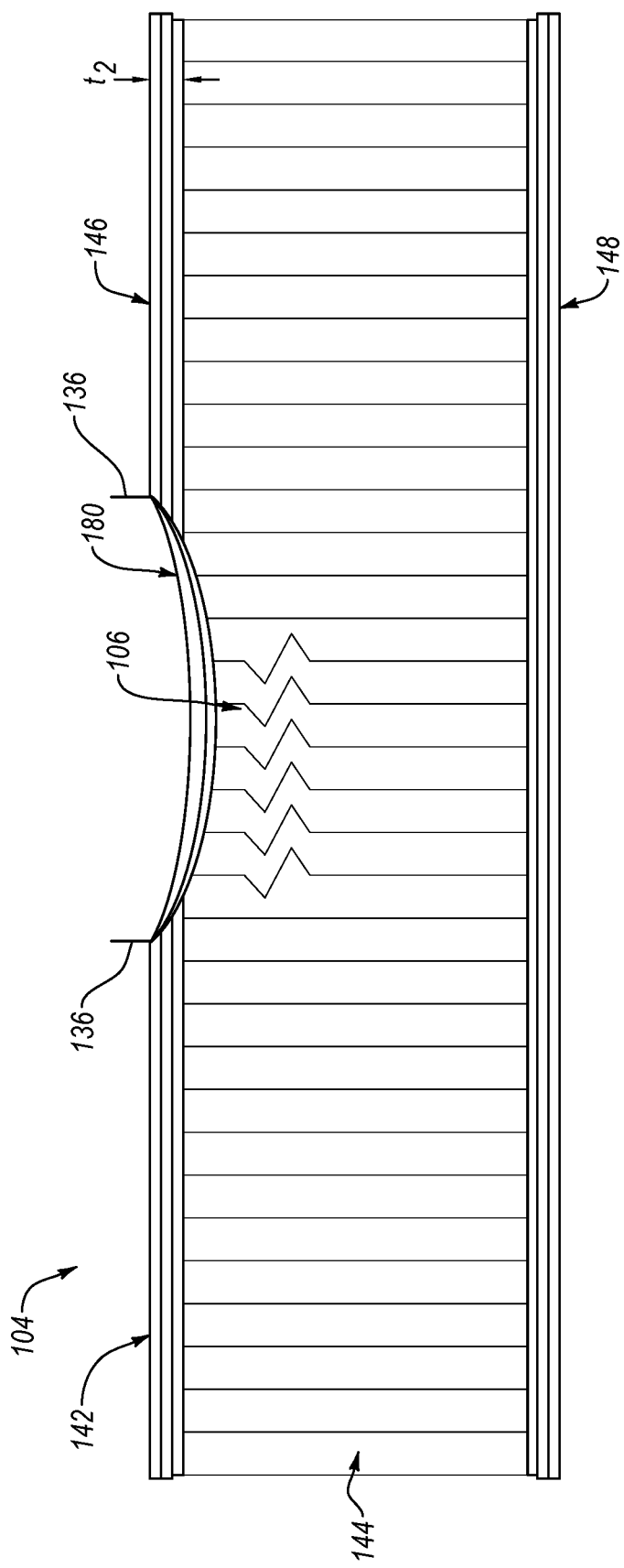
FIG. 5 is a schematic, sectional, side elevation view of a sandwich panel having an abnormality in a sheet of the sandwich panel, according to one or more examples of the present disclosure.

FIG. 5 shows an abnormality 106 on a sandwich panel 142. In various examples, one of the plies and/or the core 144 of the sandwich panel 142 has an abnormality 106. The abnormality 106 can create an abnormal surface 180, for example, on the first sheet 146 that extends to the outer peripheral edge 136. In some examples, the structural reinforcement 110 is placed over the abnormal surface 180 of the first sheet 146. In one example, a structural reinforcement 110 having the patch 112 and the pressure-sensitive tape 128 (FIG. 8) is overlaid on the abnormality 106 and structurally repairs both the abnormal surface 180 and/or an abnormality 106 in the core 144.

Figure 6:
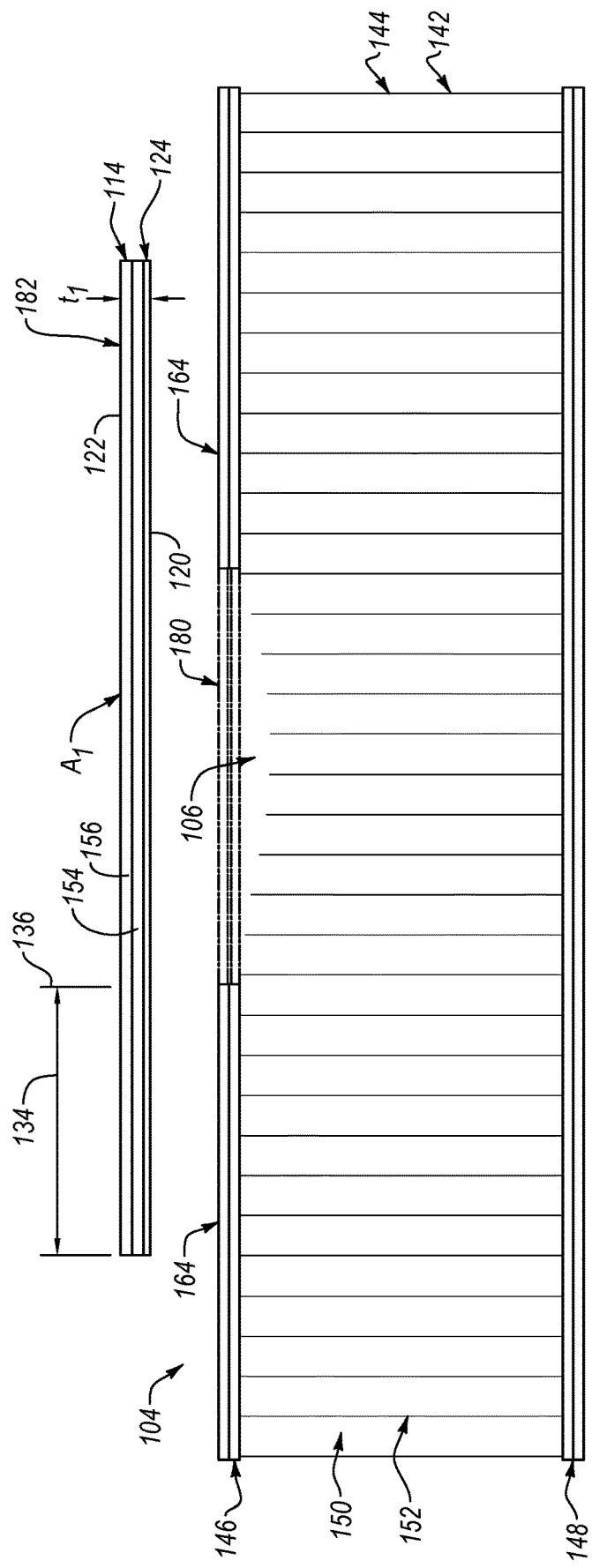
FIG. 6 is a schematic, sectional, side elevation view of a patch located over an abnormality in a sheet of a sandwich panel, according to one or more examples of the present disclosure.

FIG. 6 is a schematic perspective view of a patch 112 being applied over the abnormality 106 and/or abnormal surface 180 of the sandwich panel. As shown, the patch 112 is adhesively bonded directly to the first sheet 146 of the sandwich panel 142. In other words, the sandwich panel 142 has a core 144 (e.g., honeycomb panel 150) that is interposed between a first sheet 146 and a second sheet 148. The structural reinforcement 110 is applied to the first sheet 146 to repair the abnormality 106 in the core 144 and/or the abnormal surface 180 in the first sheet 146.

In some examples, the core 144 is a honeycomb panel 150 that is interposed between first sheet 146 and second sheet 148 and has elongated channels 152. The elongated channels 152 are oriented orthogonal to the first sheet 146 and the second sheet 148 of the sandwich panel 142. The honeycomb panel 150 separates the first sheet 146 and second sheet 148 to increase the bending strength of the sandwich panel 142 and carry a shear load between the first sheet 146 and the second sheet 148. In various examples, the abnormality 106 and/or abnormal surface 180 of the sandwich panel 142 is heated to an elevated temperature for a predetermined time to remove moisture trapped in the core 144 and/or first sheet 146. The heating process to remove moisture for the sandwich panel 142 is similar to the heating process to remove moisture for the solid laminate 140.

The patch 112 has two or more plies 114 (e.g., first ply 154 and second ply 156) configured to restore the structural strength of the repair. For example, the patch 112 is made from a fiber-reinforced polymeric material 182 that provides structural rigidity and strength to the completed repair. In one example, the fiber-reinforced polymeric material 182 is a Carbon Fiber Reinforced Polymer (CFRP).

The patch 112 also has an overlay portion 134. The overlay portion 134 extends beyond the abnormality 106 to increase the adhesion of the patch 112 and/or increase the structural strength of the repair. For example, the patch 112 has a patch adhesive 124 applied to the first side 120 of the patch 112. When the patch 112 is applied over the abnormality 106, the adhesive material 126 adheres and fixes the overlay portion 134 to the first sheet 146 of the sandwich panel 142. In various examples, the adhesive material 126 bonds and/or couples to the sandwich panel 142. The overlay portion 134 increases the adhesion between the patch 112 and the sandwich panel 142. In this way, the technician uses the overlay portion 134 of the patch 112 to define a first portion 164 and control the strength of the structural reinforcement 110 and the repair.

Figure 7:
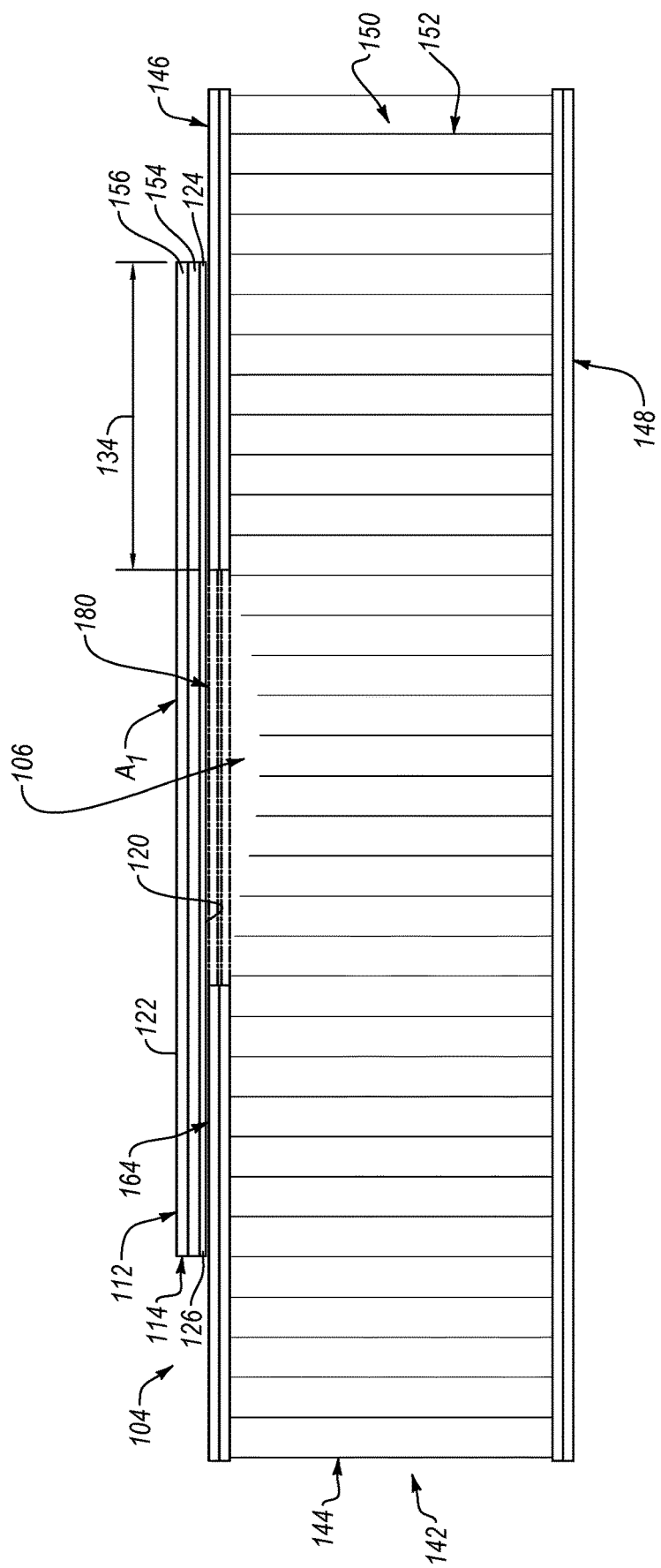
FIG. 7 is a schematic, sectional, side elevation view of a patch applied onto a surface of a sandwich panel, according to one or more examples of the present disclosure.

Referring to FIG. 7, when the patch 112 adheres to the first sheet 146 of the cured composite 104, the patch adhesive 124 in the overlay portion 134 defines a first portion 164 of the structural reinforcement 110. The first portion 164 bonds the patch 112 to the first sheet 146 of the sandwich panel 142, or another cured composite 104. The overlay portion 134 extends beyond the outer peripheral edge 136 and about an entirety of the abnormality 106. Increasing the size of the overlay portion 134 increases the strength of the structural reinforcement 110. In various examples, the size of the overlay portion 134 is increased by increasing the size or area A1 of the patch 112 and/or using multiple patches 112.

In one example, heat and/or pressure P1 are applied to the patch 112 to change the shape and/or structure of the patch 112. For example, the curvature of the patch 112 is heated to mold the patch 112 to the structure of the cured composite 104 when the patch 112 is bonded over the abnormality 106. The patch 112 overlay portion 134 also provides a structural bonding area in the first portion 164 of the cured composite 104 surrounding the abnormality 106. Specifically, the patch 112 bonds the first side 120 of the patch 112 to an outer surface of the first sheet 146 in the first portion 164 of the overlay portion 134.

FIG. 8 shows a completed structural repair. The structural reinforcement 110 has a pressure-sensitive tape 128 (a tape layer) and a patch 112 with a ply 114. The adhesive material 126 of the patch 112 bonds to the first sheet 146 of the cured composite 104. The pressure-sensitive tape 128 has two layers. The pressure-sensitive tape 128 covers a second side 122 of the patch 112 and has a metallic material 130 and a tape adhesive 132. The tape adhesive 132 is fixed to the metallic material 130 of the pressure-sensitive tape 128. The metallic material 130 adheres to the tape adhesive 132 that secures the patch 112 on the first sheet 146. The second portion 166 of the structural reinforcement 110 is defined as the bond between the pressure-sensitive tape 128 and the cured composite 104. In this way, the metallic material 130 is fixed to and covers an entirety of the second side 122 of the patch 112 and forms the second portion 166 of the structural reinforcement 110.

In some examples, the tape adhesive 132 is separate from the adhesive material 126 on the patch 112. For example, the adhesive material 126 of the patch 112 bonds with the first sheet 146. The tape adhesive 132 bonds the pressure-sensitive tape 128 to the cured composite 104 surrounding the bond between the adhesive material 126 of the patch 112 and the cured composite 104. The pressure-sensitive tape 128 covers an entirety of the second side 122 of the patch 112. The area under the pressure-sensitive tape 128 is coupled to the cured composite 104 and defines the second portion 166 of the structural reinforcement 110. For example, the second portion 166 of the structural reinforcement 110 bonds the pressure-sensitive tape 128 directly to the first sheet 146 of the sandwich panel 142.

Because the structural reinforcement 110 includes the patch 112 and the pressure-sensitive tape 128, the repair strength of the structural reinforcement 110 is equal to the sum of the patch strength (e.g., of the patch 112) and the tape strength of the pressure-sensitive tape 128. In various examples, the patch strength is greater than the tape strength and the repair strength is greater than the strength tolerance for the structural member 102 of the cured composite 104. For example, a particular structural member 102 on an aircraft 186 is designed to have a strength tolerance in bending, shear, bearing, compression, and/or tension. The structural reinforcement 110 increases the strength tolerance of the cured composite 104 for the structural member 102. In other words, the structural reinforcement 110 restores and/or increases the strength.

In some examples, the structural reinforcement 110 uses multiple and/or overlapping patches 112 to restore the designed strength tolerance of the cured composite 104. The use of overlapping and/or multiple patches 112 to increase the design strength tolerance enables customization and/or adjustment of the structural reinforcement 110 for the specific abnormality 106. For example, when the patch strength of the patch 112 is less than the strength tolerance, the patch strength of the structural reinforcement 110 is increased by adding and orienting patches 112 until the repair strength is equal to or greater than the design strength tolerance. This is accomplished by using multiple and/or overlapping patches 112 and/or utilizing the overlay portion 134, the first portion 164, and/or the second portion 166 of the pressure-sensitive tape 128.

The pressure-sensitive tape 128 is applied over the second side 122 of the patch 112 (and/or patches). In one example, the pressure-sensitive tape 128 is applied without any heat or pressure being applied to the patch 112. The patch adhesive 124 bonds directly to the cured composite 104. In some examples, once the patch 112 is oriented on the first sheet 146, a vacuum pressure P1 is applied to bond the patch adhesive 124 on the patch 112 to the cured composite 104. The pressure P1 can be positive or negative relative to atmospheric pressure. For example, the pressure P1 is a vacuum pressure applied locally to the patch 112.

Figure 9:
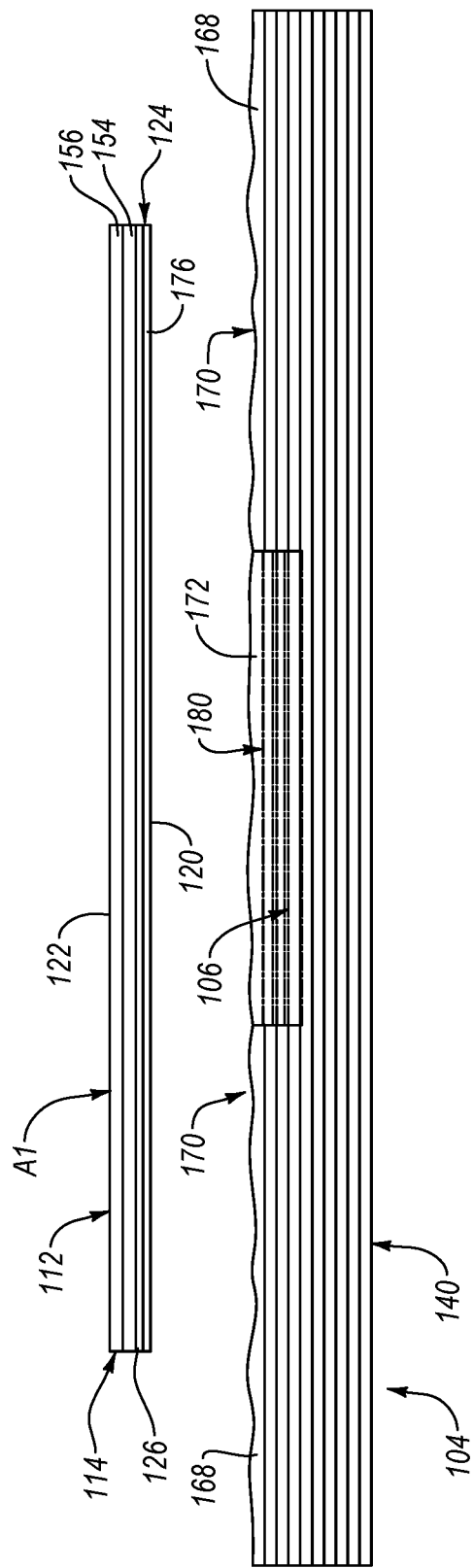
FIG. 9 is a schematic, sectional, side elevation view of a patch located over an abnormality in a solid laminate, where the patch includes a protective layer that protects a patch adhesive of the patch, according to one or more examples of the present disclosure.

Referring to FIG. 9, a protective layer 176 is shown on the patch 112. The protective layer 176 protects the patch adhesive 124 until the patch 112 is applied over the abnormality 106 on the solid laminate 140. In various examples, the solid laminate 140 is prepared for the structural reinforcement 110 application before adhering the patch 112 to the cured composite 104. The protective layer 176 protects the patch adhesive 124 during the preparation process until the patch 112 is ready to be adhered and/or bonded on the cured composite 104. For example, when the abraded portion 170 is cleaned and/or dried, the protective layer 176 is removed from the patch adhesive 124, and the patch 112 bonds directly to the cured composite 104.

For example, paint or a coating layer 168, such as a fiberglass or non-structural ply, is bonded to an outermost ply of the solid laminate 140. In this configuration, the coating layer 168 surrounds the abnormality 106 and/or the abnormal surface 180. If the coating layer 168 is not removed, the patch 112 will bond directly to the non-structural coating layer. Specifically, the first portion 164 of the structural reinforcement 110 at least partially bonds to the coating layer 168. In some examples, the coating layer 168 is removed before the patch 112 is applied to the cured composite 104.

Structural repairs on a cured composite 104 with paint and/or a coating layer 168 may remove the paint and/or coating layer 168. The first ply 154 of the patch 112 is bonded with the outermost one or ones of the plies 114 on the cured composite 104.

Figure 10:
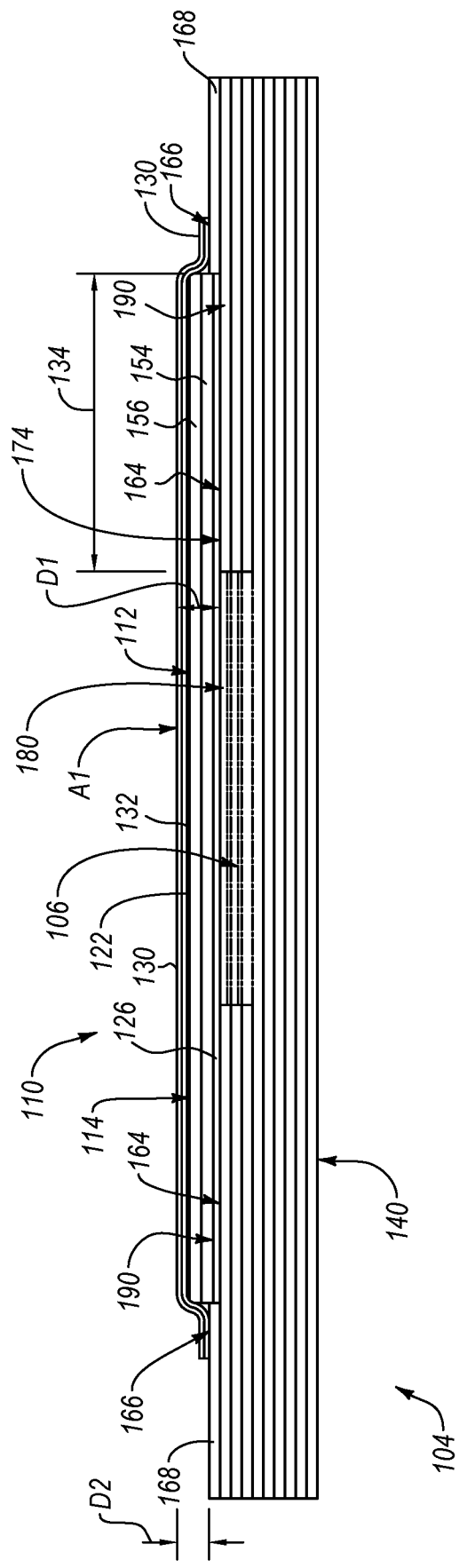
FIG. 10 is a schematic, section, side elevation view of a patch adhered to the solid laminate, according to one or more examples of the present disclosure.

The abrading, cleaning, and/or drying process shown in FIGS. 9 and 10 prepares the cured composite 104 for bonding with the patch 112. The plies 114 of the cured composite 104 are prepared for bonding to the patch 112. For example, the clean abraded portion 174 creates a surface that provides an enhanced structural bond for the patch 112. The clean abraded portion 174 of FIG. 10 is stepped. FIG. 10 shows the first portion 164 under patch 112 with a stepped depth D1 from the abraded portion 170 to the second side 122 of the patch 112. The second portion 166 has a second depth D2 from the coating layer 168 to the second side 122 of the patch 112. The first depth D1 is greater than the second depth D2. In some examples, the location of the abnormality 106 defines the first depth D1. For example, a repair depth under the patch 112 for a core 144 extends through the thickness t2 of the plies 114. The repair depth is equal to (or greater) than the first depth D1, e.g., under the first portion 164.

During the repair process, the solid laminate 140 of the cured composite is abraded and cleaned before the patch adhesive 124 bonds with the matrix material 118 in the cured composite 104. The protective layer 176 that covers the patch 112 protects the patch adhesive 124 during the abrading process to prevent dust and debris from entering the adhesive material 126. The protective layer 176 is releasably coupled to the patch adhesive 124 and removed to promote bonding between the patch adhesive 124 and the matrix material 118 of the cured composite 104. For example, the protective layer 176 over the patch adhesive 124 is removed following the abrading process when a repair area 190 is clean and/or the abnormality 106 is removed.

The patch 112 is applied directly onto the clean abraded portion 174. In various examples, the patch adhesive 124 adheres or bonds without heating, curing, or other pressure/temperature treatments. Alternatively, the patch adhesive 124 is locally pressurized (e.g., in a vacuum) to create a vacuum pressure that adheres the patch 112 directly to the plies 114.

FIG. 10 shows the completed structural reinforcement 110 with the patch 112 applied over a clean abraded portion 174 and the pressure-sensitive tape 128 applied over the patch 112. In this configuration, the cured composite 104 has been abraded, cleaned, and/or heated to prepare a bonding surface (e.g., repair area 190) for the patch 112. For example, the cured composite 104 is heated to a predetermined temperature to remove moisture from the first portion 164, the second portion 166, the abnormality 106, and/or the abnormal surface 180 of the cured composite 104. In some examples, heat and/or pressure P1 are also applied to the patch 112, for example, to mold the patch 112. Subsequent pressure P1 may be used to adhere the patch adhesive 124 on the matrix material 118 of the cured composite 104 so that the patch 112 is adhesively bonded over the abnormality 106.

In various examples, a patch adhesive 124 on the patch 112 is coupled to the matrix material 118 in the cured composite 104 to effectuate a structural repair. The pressure-sensitive tape 128 covers the second side 122 of the patch 112. The metallic material 130 and the tape adhesive 132, fixed to the metallic material 130, provide the tape strength of the pressure-sensitive tape 128. The structural reinforcement 110 provides a structural repair on the cured composite 104 with a repair strength capable of supporting the expected loads. In general, the patch strength is greater than the tape strength and the structural reinforcement 110 creates a repair strength that meets and/or exceeds the strength tolerance of the structural member 102.

Figure 11:
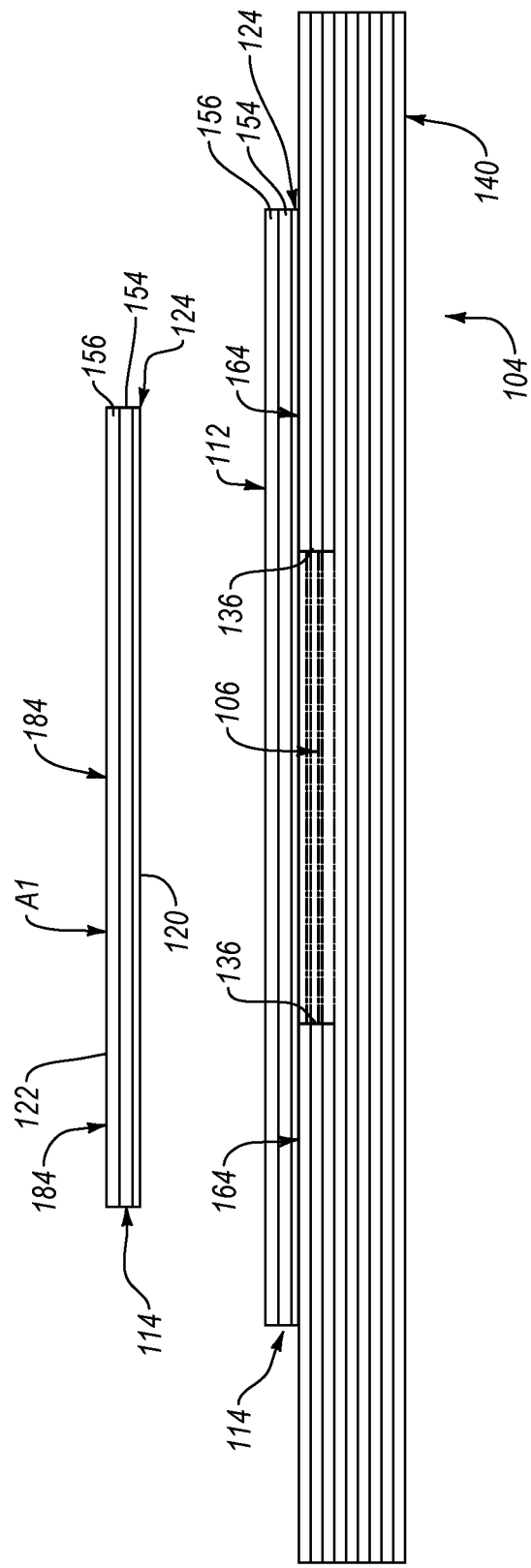
FIG. 11 is a schematic, sectional, side elevation view of a first patch, a second patch, and a solid laminate, according to one or more examples of the present disclosure.

FIG. 11 is a perspective view of a second patch 184 applied on the patch 112. In various examples, multiple patches are applied to the abnormality 106 and/or abnormal surface 180 of the cured composite 104. In various examples, the second patch 184 is applied directly on/over the patch 112 and/or overlaps the patch 112. In other words, the second patch 184 extends one or more of the thickness t1, the length L1, and/or the width W1 of the structural reinforcement 110.

The second patch 184 is applied directly on an exterior surface (e.g., the second side 122) of the patch 112. The second patch 184 partially or completely covers the patch 112 and increases the thickness and/or area A1 of the structural reinforcement 110, e.g., by extending the overlay portion 134 in a length L1 and/or width W1 direction of the patch 112. FIG. 11 shows the cross-section of the second patch 184 overlapping the patch 112 to increase the overlay portion 134 of the structural reinforcement 110 in a different direction, e.g., L1 and/or W1.

Additional patches can be added, joined, and/or overlapped to the patch 112 and/or the second patch 184 to create a structural reinforcement 110 that is configured with a first portion 164 (e.g., length L1 and/or width W1), that is more extensive, under the plurality of patches (e.g., first and second patches 112 and 184). The increased patch 112 area A1 increases the bonded adhesive layer between the patch 112 and the cured composite 104 thereby increases the effective repair strength of the patch 112. Multiple patches increase adhesion and/or thickness t1 in the plies of patch 112. The increased patch 112 thickness t1 increases the plies 114 in the patch 112 and thereby increases the repair strength. By increasing a size of the bonding area and/or increasing a thickness of the patch 112, multiple patches increase the repair strength of the structural reinforcement 110.

In various examples, the second patch 184 is captured between the second side 122 of the patch 112 and the tape adhesive 132 of the pressure-sensitive tape 128. For example, the pressure-sensitive tape 128 covers the entirety of the second patch 184 and the second side 122 of the patch 112. The second patch 184 increases the thickness of the plies 114 on the patch 112 and/or increases an overlay portion 134 of the structural reinforcement 110. The repair is customized or tailored for the abnormality 106 by overlaying patches (e.g., 112 and/or 184) in different directions over the abnormality 106 and/or bonding the various patches to the cured composite 104.

A set or group of patches (e.g., the first patch 112 and the second patch 184) enable the technician to customize the properties of the structural reinforcement 110 and repair the abnormality 106. The area/size of the second portion 166 under the structural reinforcement 110 (e.g., under the pressure-sensitive tape 128) also increases with second patches 184 that are overlapped. The increased first portion 164 and the second portion 166 of the custom overlapped and/or thickened plurality of patches (112 and/or 184) also increases the repair strength of the ply or plies of structural reinforcement 110. In this way, a set or kit with a plurality of predefined patches 112 (e.g., with fixed sizes, areas A1, and/or contours) are joined and/or overlaid to create a tailored repair strength for an abnormality 106 in the cured composite 104.

Figure 12:
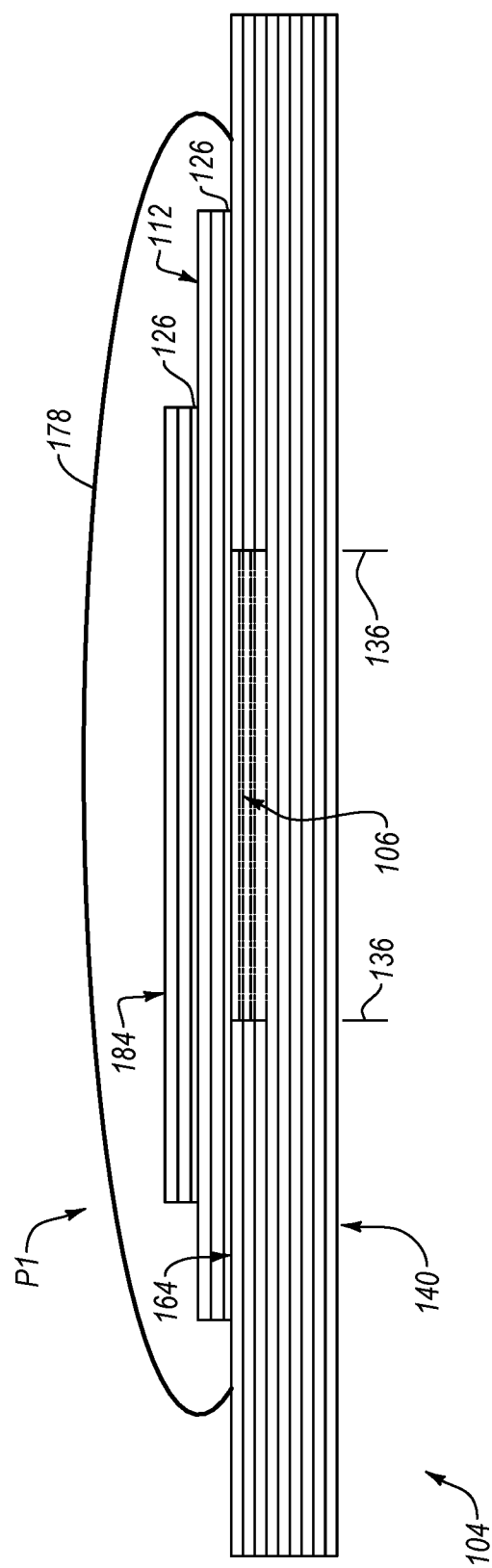
FIG. 12 is a schematic, sectional, side elevation view of a vacuum bag enclosing patches attached to a solid laminate, according to one or more examples of the present disclosure.

FIG. 12 shows a vacuum bag 178 for creating a vacuum pressure or removing pressure during the repair. The vacuum bag 178 applies local pressure P1, e.g., creates a vacuum pressure, to adhere and bond the patch 112. The vacuum bag 178 adjusts the pressure P1 on the patch 112 and/or the second patch 184. The reduced pressure P1 in the vacuum bag 178 increases a clamping force between the repair area 190 of the cured composite 104 and the patch 112. The increased clamping force created by the reduced pressure P1 of the vacuum bag 178 increases the adhesion of the patch adhesive 124.

The vacuum bag 178 locally regulates the pressure on the patch 112 and/or the second patch 184 during the bonding process. The vacuum bag 178 creates a clamping force between the first patch 112, the second patch 184, and/or the cured composite 104 to increase the adhesion and/or bond under the first portion 164 of the structural reinforcement 110. The vacuum bag 178 creates a vacuum pressure P1 on the patch 112 that enhances the clamping force and the resulting bond of the patch adhesive 124. Similarly, the resulting bond of the second patch 184 is also enhanced.

Figure 13:
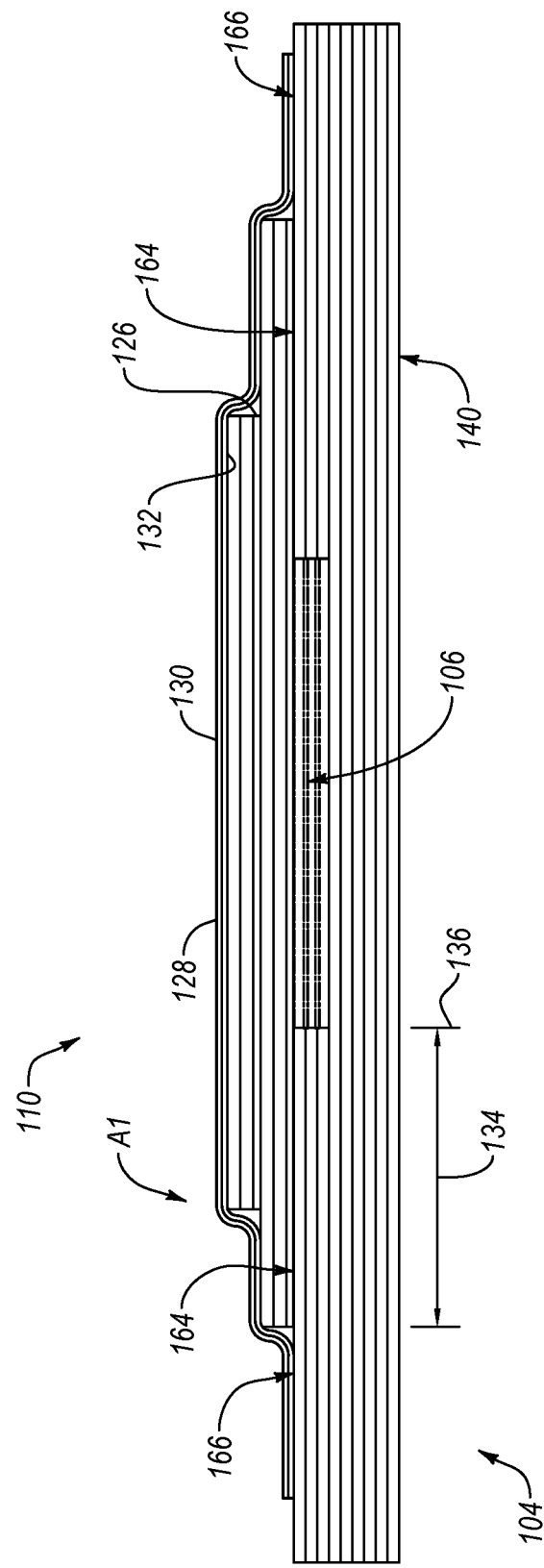
FIG. 13 is a schematic, sectional, side elevation view of a structural reinforcement, having multiple patches and a tape layer, attached to a solid laminate, according to one or more examples of the present disclosure.

Referring to FIG. 13, multiple overlaid patches (e.g., first and second patches 112 and 184) are shown in a structural reinforcement 110. A tape layer of pressure-sensitive tape 128 is fixed over the patch 112 and/second patch 184. Tape adhesive 132 bonds the second patch 184 to the second side 122 of the patch 112. The first side 120 of the patch 112 bonds over the abnormality 106 and on the overlay portion 134 of the cured composite 104.

In some examples, the second patch 184 bonds to the patch 112 and the cured composite 104. The second patch 184 is interposed between the second side 122 of the patch 112 and the pressure-sensitive tape 128. In various examples, the second patch 184 is overlaid on patch 112 to extend a thickness and/or the overlay portion 134 of the structural reinforcement 110. In other words, multiple patches 112 and/or 184 are used to increase a thickness t1 and/or area A1 of the structural reinforcement 110. The pressure-sensitive tape 128 covers the entirety of the second patch 184 and/or the second side 122 of the patch 112 to increase the strength.

The pressure-sensitive tape 128 also adheres to the patch 112 and a second portion 166 of the cured composite 104 surrounding the first portion 164 of the cured composite 104. In other words, the pressure-sensitive tape 128 adheres to the exterior side (e.g., second side 122) of the patches 112 and/or 184 and the second portion 166 of the cured composite 104. The second portion 166 surrounds the first portion 164 under the patches 112 and/or 184 of the cured composite 104. The second portion 166 bonds the pressure-sensitive tape 128 directly to the cured composite 104 and thereby increases the adhesion of the structural reinforcement 110 on the cured composite 104.

Figure 14:
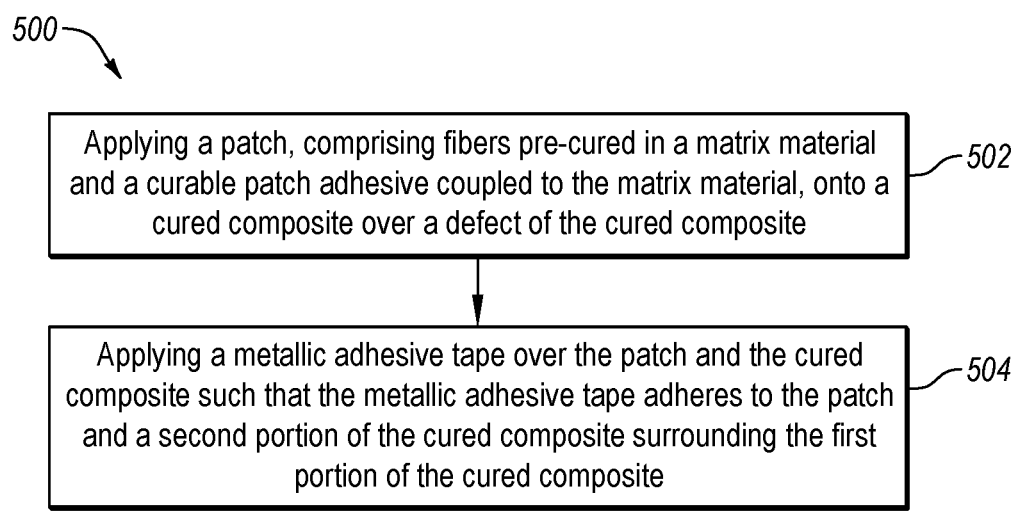
FIG. 14 is a schematic flow diagram of a method of repairing a composite structure, according to one or more examples of the present disclosure.

Referring to FIG. 14, a method 500 for repairing an abnormality 106 in the composite structure 100 includes applying 502 the patch 112 with fiber reinforcement 116 embedded in the matrix material 118. The patch 112 has a patch adhesive 124 that couples the matrix material 118 onto the cured composite 104 over an abnormality 106. The first portion 164 of the cured composite 104 surrounds the abnormality 106 under the patch 112. Method 500 further includes applying 504 a pressure-sensitive tape 128 over the patch 112 and the cured composite 104. The pressure-sensitive tape 128 adheres to the patch 112 and a second portion 166 of the cured composite 104 surrounding the first portion 164 of the cured composite 104.

Figure 15:
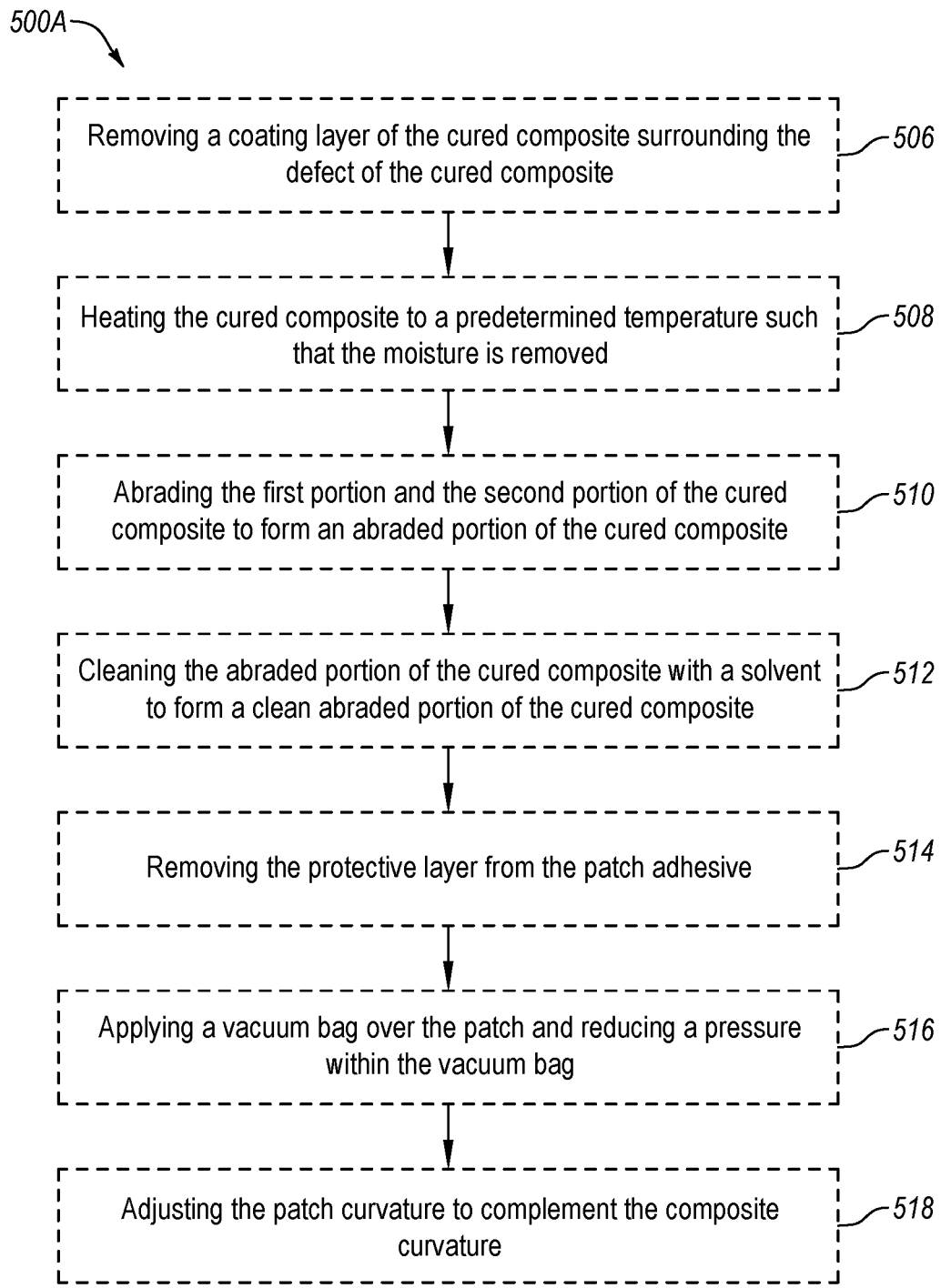
FIG. 15 is a schematic flow diagram of a method of repairing a composite structure, according to one or more examples of the present disclosure.

FIG. 15 is a schematic flow diagram of a method 500A for various optional/additional steps that can be included with the method 500. According to one example, step removes 506 the coating layer 168 on the cured composite 104 surrounding the abnormality 106 of the cured composite 104.

In one example, before applying 502 the patch 112 and after removing the coating layer 168 of the cured composite 104, the first portion 164 and/or the second portion 166 of the cured composite 104 are abraded 510 to form an abraded portion 170 on the cured composite 104. The first portion 164 and/or the second portion 166 of the cured composite 104 are abraded 510. The abraded portion 170 of the cured composite 104 is cleaned 512 with a solvent 172 that cleans and prepares the repair area 190 of the abraded portion 170 on the cured composite 104 for the patch 112. The patch 112 is then applied on the clean abraded portion 174 of the cured composite 104.

In some examples, the patch 112 has a protective layer 176 that covers and is releasably coupled to the patch adhesive 124. In this example, the process includes removing 514 the protective layer 176 from the patch adhesive 124 before applying 502 the patch 112 onto the cured composite 104. In one example, the vacuum bag 178 is applied 516 over the patch 112. The vacuum bag 178 locally applies and/or reduces a pressure P1 on the repair area 190 within the vacuum bag 178.

In some examples, the patch 112 has a patch curvature different from a composite curvature of the cured composite 104. In this example, the patch curvature of the patch 112, for example, by heating and/or manipulating the patch 112, is adjusted to complement the curvature of the structural member 102.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive unless expressly specified otherwise. The terms "a," "an," and "the" also refer to "one or more" unless expressly specified otherwise. Further, the term "plurality" can be defined as "at least two." Moreover, unless otherwise noted, as defined herein, a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other but having one or more additional elements between the coupled elements. Further, as used herein, securing one element to another element can include direct securing and indirect securing. Additionally, as used herein, "adjacent" does not necessarily denote contact. For example, one element can be adjacent to another element without being in contact with that element.

As used herein, the phrase "at least one of," when used with a list of items, means different combinations of one or more of the listed items may be used, and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc., are used herein merely as labels and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having the potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. For example, solid boxes are used to designate steps of a method and dashed boxes show various alternative steps. In various methods, all or some of the steps indicated by the dashed boxes and/or solid boxes may be performed. Similarly, not all the steps need to be performed to successfully use the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A composite structure, comprising:
   a structural member made of a cured composite, the cured composite comprising a cured-composite plurality of unidirectional fibers and defining a strength tolerance, the structural member comprising a solid laminate having an abnormality in the solid laminate, wherein the abnormality has a reduced strength relative to the strength tolerance of the cured composite; and
   a structural reinforcement coupled to the cured composite over the abnormality and having a repair strength, the structural reinforcement comprising:
   a patch covering a predetermined area greater than the abnormality of the solid laminate and comprising:
      a plurality of plies, wherein:
         a first ply in the plurality of plies comprises a first-ply plurality of unidirectional fibers embedded in a matrix material and oriented in a first direction that is parallel to the cured-composite plurality of unidirectional fibers;
         a second ply in the plurality of plies comprises a second-ply plurality of unidirectional fibers oriented in a second direction that is different than the first direction; and
         the plurality of plies define a first side of the plurality of plies and a second side of the plurality of plies opposite the first side; and
      a patch adhesive comprising an adhesive material that is on the first side of the plurality of plies, wherein the first side of the plurality of plies is adhesively bonded directly to the cured composite of the structural member via the patch adhesive; and
   a pressure-sensitive tape comprising a metallic material and a tape adhesive, fixed to the metallic material, wherein the pressure-sensitive tape is fixed to and covers an entirety of the second side of the patch.

2. The composite structure of claim 1, wherein the repair strength of the structural reinforcement is equal to or exceeds the strength tolerance of the cured composite.

3. The composite structure of claim 1, wherein the patch further comprises an overlay portion that extends beyond an outer peripheral edge of the abnormality and about an entirety of the abnormality.

4. The composite structure of claim 1, wherein:
   the predetermined area comprises a first area;
   the patch adhesive covers a second area; and
   the second area is not greater than the first area.

5. The composite structure of claim 1, wherein the first side of the plurality of plies is adhesively bonded directly to the solid laminate.

6. The composite structure of claim 1, wherein:
   the cured composite is a sandwich panel, comprising a core interposed between a first sheet and a second sheet; and the first side of the plurality of plies is adhesively bonded directly to the first sheet.

7. The composite structure of claim 6, wherein:
the core comprises a honeycomb panel having elongated channels that are oriented orthogonally relative to the first sheet and the second sheet; and
the honeycomb panel carries a shear load between the first sheet and the second sheet.

8. The composite structure of claim 1, wherein:
the repair strength is equal to a summation of a patch strength of the patch and a tape strength of the pressure-sensitive tape; and
the patch strength is greater than the tape strength.

9. The composite structure of claim 8, wherein the repair strength is greater than the strength tolerance.

10. The composite structure of claim 8, wherein the patch strength is less than the repair strength.

11. The composite structure of claim 1, wherein:
the plurality of plies comprises a first ply and a second ply; and
the tape adhesive contacts a first-ply edge of the first ply and a second-ply edge of the second ply.

12. The composite structure of claim 1, wherein:
the first direction is orthogonal to the second direction.

13. The composite structure of claim 11, wherein:
the first direction is 45° relative to the second direction.

14. A method of repairing a composite structure, the method comprising:
applying a patch, comprising a plurality of plies comprising fibers embedded in a matrix material and a patch adhesive coupled to the plurality of plies, onto a first portion of a cured composite over and surrounding an abnormality in a solid laminate of the cured composite so that the plurality of plies is adhesively bonded directly to the first portion of the cured composite via the patch adhesive and the patch covers a predetermined area greater than the abnormality of the cured composite, wherein:
the cured composite comprises a cured-composite plurality of unidirectional fibers; and
the plurality of plies comprises:
a first ply, wherein the first ply comprises a first-ply plurality of unidirectional fibers embedded in a matrix material and oriented in a first direction that is parallel to the cured-composite plurality of unidirectional fibers; and
a second ply, wherein the second ply in the plurality of plies comprises a second-ply plurality of unidirectional fibers oriented in a second direction that is different than the first direction; and
applying a pressure-sensitive tape, comprising a metallic material and a tape adhesive fixed to the metallic material, over the patch and the cured composite such that the tape adhesive of the pressure-sensitive tape adheres to the patch and a second portion of the cured composite surrounding the first portion of the cured composite.

15. The method of claim 14, further comprising:
removing a coating layer of the cured composite surrounding the abnormality of the cured composite;
prior to applying the patch and after removing the coating layer of the cured composite, abrading the first portion and the second portion of the cured composite to form an abraded portion of the cured composite;
prior to applying the patch and after removing the coating layer, cleaning the abraded portion of the cured composite with a solvent to form a clean abraded portion of the cured composite; and
wherein applying the patch comprises applying the patch onto the clean abraded portion of the cured composite.

16. The method of claim 14, wherein:
the patch further comprises a protective layer that covers and is releasably coupled to the patch adhesive; and
the method further comprises removing the protective layer from the patch adhesive before applying the patch onto the cured composite.

17. The method of claim 14, further comprising, after applying the patch onto the cured composite, applying a vacuum bag over the patch and reducing a pressure within the vacuum bag.

18. The method of claim 14, wherein:
the patch has a patch curvature that is different from a composite curvature of the cured composite; and
applying the patch onto the cured composite further comprises adjusting the patch curvature to complement the composite curvature.

19. A structural reinforcement for repairing an abnormal surface of a composite structure, comprising:
a patch, having a patch strength and comprising:
a plurality of plies in a stacked arrangement, wherein:
a first ply of the plurality of plies is made of a fiber-reinforced polymeric material comprising a matrix material and a first-ply plurality of unidirectional fibers embedded in the matrix material and oriented in a first direction that is parallel to a cured-composite plurality of unidirectional fibers of the composite structure;
a second ply of the plurality of plies comprises a second-ply plurality of unidirectional fibers oriented in a second direction that is different than the first direction; and
the plurality of plies defines a first side and a second side of the plurality of plies, opposite the first side; and
a patch adhesive fixed on the first side of the plurality of plies and comprising an adhesive material; and
a pressure-sensitive tape, having a tape strength and comprising a metallic material and a tape adhesive, fixed to the metallic material,
wherein:
the pressure-sensitive tape is fixed to and covers an entirety of the second side of the patch;
the patch strength is greater than the tape strength; and
the plurality of plies of the patch is large enough so that the first side of the plurality of plies is adhesively bondable directly to a solid laminate of a cured composite of the composite structure via the patch adhesive such that the patch covers a predetermined area that is greater than an area of an abnormality in the solid laminate.

20. The structural reinforcement of claim 19, further comprising a second patch coupled to the patch and captured between the second side of the patch and the tape adhesive of the pressure-sensitive tape, wherein the pressure-sensitive tape covers the entirety of the second patch and the second side of the patch.

* * * * *